United States Patent [19]

Matsuda et al.

[11] 4,322,511

[45] Mar. 30, 1982

[54] PROCESS OF HYDROLYZING FLUORINE-CONTAINING MULTI-COMPONENT COPOLYMERS

[75] Inventors: Osamu Matsuda; Terutaka Watanabe, both of Takasaki; Yoneho Tabata, Tokyo; Sueo Machi, Takasaki, all of Japan

[73] Assignee: Japan Atomic Energy Research Institute, Tokyo, Japan

[21] Appl. No.: 158,824

[22] Filed: Jun. 12, 1980

Related U.S. Application Data

[62] Division of Ser. No. 85,328, Oct. 16, 1979, Pat. No. 4,294,675.

[30] Foreign Application Priority Data

Oct. 18, 1978 [JP] Japan .............................. 53-128206
Mar. 20, 1979 [JP] Japan .............................. 54-32962
Mar. 20, 1979 [JP] Japan .............................. 54-32963
Apr. 27, 1979 [JP] Japan .............................. 54-52278

[51] Int. Cl.³ ...................... C08F 8/12; C08F 214/18; C08F 8/00
[52] U.S. Cl. ............................. 525/344; 204/159.14; 521/31; 525/329; 525/355; 525/369; 525/377; 525/378; 525/384; 525/386
[58] Field of Search .............. 526/245, 218, 227, 229; 204/159.14, 159.22; 525/329, 384, 344, 355, 369, 377, 378, 386; 521/31

[56] References Cited

U.S. PATENT DOCUMENTS 3,654,245 4/1972 Kometani et al. .................. 526/245
4,174,426 11/1979 Asami et al. ......................... 521/31
4,204,927 5/1980 Carlson ........................ 204/159.14

*Primary Examiner*—Harry Wong, Jr.
*Attorney, Agent, or Firm*—Browdy and Neimark

[57] ABSTRACT

A novel process for the production of fluorine-containing multi-component copolymers having functional groups is disclosed, which process is characterized in that tetrafluoroethylene having the formula: $CF_2=CF_2$; one or two or more $\alpha,\beta,\beta$-trifluoroacrylate having the generic formula: $CF_2=CFCOOC_nH_{2n+1}$ wherein n represents an integer of 1 or greater; and one or two or more $\alpha$-olefin having the generic formula:

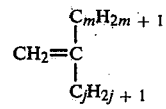

wherein j and m each independently represents an integer of 0 to 11 inclusive; are copolymerized with one another in the presence of a radical initiator. The resultant interpolymer is hydrolyzed and cross-linked using ionizing radiation.

57 Claims, 3 Drawing Figures

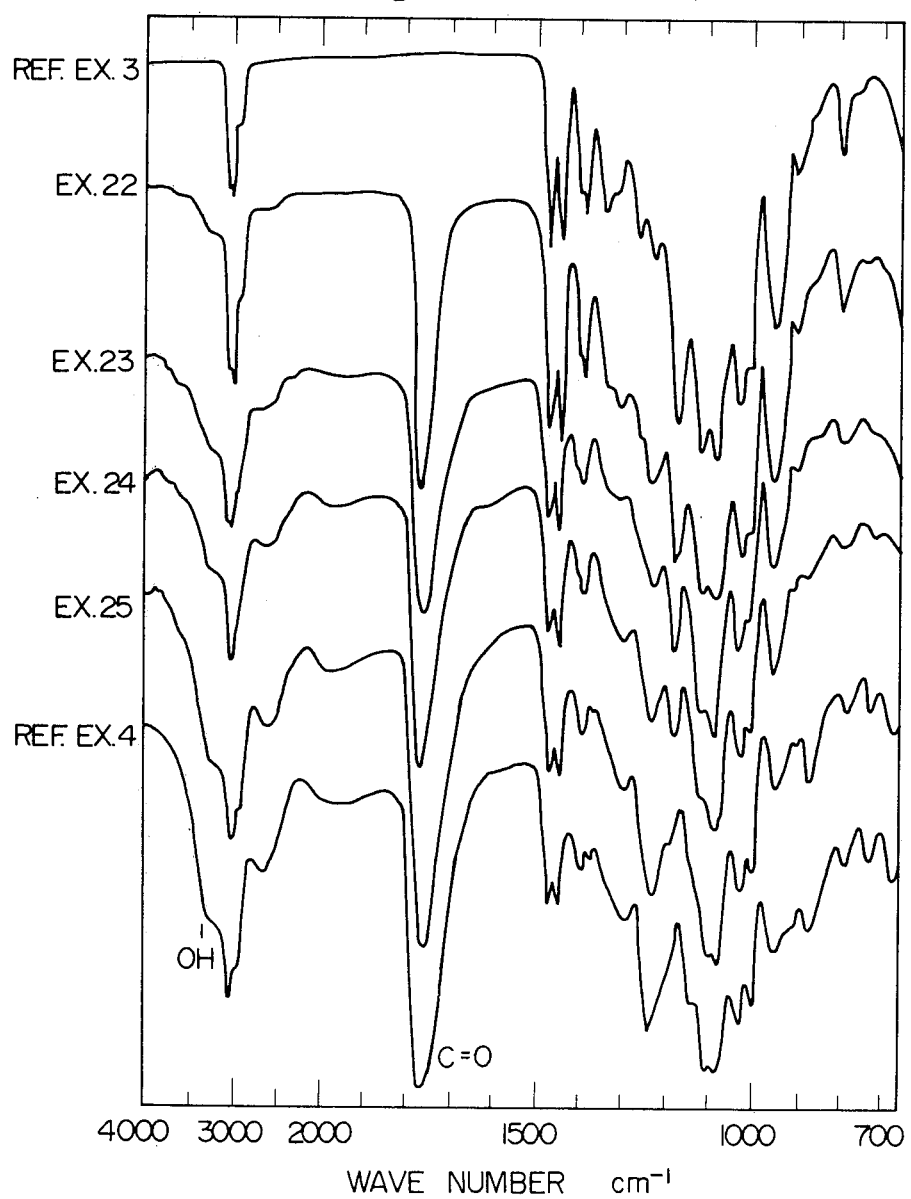

PROCESS OF HYDROLYZING FLUORINE-CONTAINING MULTI-COMPONENT COPOLYMERS

This is a division of application Ser. No. 085,328 filed Oct. 16, 1979, now U.S. Pat. No. 4,294,675, Oct. 13, 1981.

This invention relates to a process for the production of fluorine-containing polymers having functional groups, which process is characterized in that the following monomers: tetrafluoroethylene of the formula: $CF_2=CF_2$; an $\alpha,\beta,\beta$-trifluoroacrylate having the generic formula: $CF_2=CFCO_2C_nH_{2n+1}$ wherein n is an integer of 1 or greater preferably 1–4; and an $\alpha$-olefin having the generic formula:

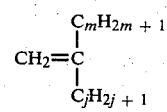

wherein j and m each represents independently an integer of 0 through 11 inclusive; are copolymerized with one another in the presence of an initiator of polymerization.

In another aspect, this invention relates to a process for the introduction of ester groups into the fluorine-containing polymers and, what is more, it relates to a process wherein such introduction is accomplished with any desired ester group content in the resulting copolymer.

In particular, the present invention provides a process for controlling the ester group content in a copolymer comprising an $\alpha,\beta,\beta$-trifluoroacrylate and an $\alpha$-olefin, or from a different point of view, the present invention provides a process for introducing ester groups into copolymers comprising tetrafluoroethylene and an $\alpha$-olefin to any desired content of the ester groups.

We have long been studying the synthesis of fluorine-containing polymers having certain functional groups such as a carboxyl group, an ester group and the like for the purpose of developing improved adhesives and ion exchangers having superior resistance to both heat and chemicals. As a result of such study, we have discovered that in the presence of an initiator of radical polymerization an $\alpha,\beta,\beta$-trifluoroacrylate and an $\alpha$-olefin react easily with each other to copolymerize into an alternating copolymer having the molar ratio of component monomers of 1:1 over the mixing ratio of monomers widely ranging from 10/90 to 90/10 in terms of molar ratio. Based on this discovery we have succeeded in synthesizing a fluorine-containing polymer having contained therein approximately 50% by mole of the $\alpha,\beta,\beta$-trifluoroacrylate component (cf. Japanese Patent Application No. 53-4645).

We have studied further and finally succeeded in introducing carboxyl groups into the copolymer by hydrolyzing the ester groups contained in the copolymer having said 1:1 ratio of components of the $\alpha,\beta,\beta$-trifluoroacrylate and the $\alpha$-olefin to thereby produce a hydrophilic fluorine-containing polymer (cf. Japanese Patent Application No. 53-74044).

However, as already mentioned, an $\alpha,\beta,\beta$-trifluoroacrylate and an $\alpha$-olefin are copolymerized to form a copolymer having the molar ratio of approximately 1 to 1 over wide range of a mixture of the monomers. Thus, since this type of copolymerization always produces a copolymer theoretically having 50% by mole of the $\alpha,\beta,\beta$-trifluoroacrylate monomer component, it has been impossible to freely control the ester groups content in this fluorine-containing copolymer by merely changing the reaction conditions such as the molar ratio of monomers, the temperature, the pressure and the like. This means that it is difficult for us to obtain, for example, an ion exchanger of wanted exchange capacity by the hydrolysis of the copolymer to convert ester groups contained therein to carboxyl groups.

Thus, it is one object of our invention to eliminate these defects inherent in the prior art products of $\alpha,\beta,\beta$-trifluoroacrylate/$\alpha$-olefin copolymer and provide a process of freely controlling the ester groups content in the fluorine-containing copolymer without impairing the characteristic alternating structure between the fluorine-containing olefin moiety and the $\alpha$-olefin moiety in said copolymer.

During our long time systematic study on the copolymerization of a fluorine-containing olefin and an $\alpha$-olefin, we have encountered several cases wherein said two types of comonomers effect the alternating copolymerization. For example, tetrafluoroethylene and an $\alpha$-olefin copolymerize with each other to form an alternating copolymer having the molar ratio of 1:1 over the wide range of a mixture of the monomers extending from 10/90 to 90/10. These copolymers can be characterized in that they exhibit excellent resistance to both heat and chemicals in spite of their containing 50% by mole of the $\alpha$-olefin moiety. Practically, tetrafluoroethylene/ethylene copolymers are known as preferred "engineering plastics" having superior fabrication quality and resistance to heat and chemicals. Also, tetrafluoroethylene/propylene copolymers are heat-resistant fluorine-containing elastomers which have been developed by us as a result of our long time elaborate investigation and have already been commercially available in an industrial scale. The tetrafluoroethylene/propylene copolymers mentioned above are fluorine-containing elastomers having specific characteristic properties in that they exhibit not only such mechanical properties as are comparable to BITON (a registered trade mark to Du Pont), which is one of the representative fluorine-containing elastomers now available having excellent resistance to heat and chemicals, but also resistance to both acid and alkali even superior to BITON.

We have paid attention to the fact that either of tetrafluoroethylene and an $\alpha,\beta,\beta$-trifluoroacrylate can copolymerize with an $\alpha$-olefin to form a copolymer having the molar ratio of 1:1, and also to the fact that either of tetrafluoroethylene and an $\alpha,\beta,\beta$-trifluoroacrylate includes the trifluorovinyl group as a common structural moiety and either of them can be polymerized via free radical mechanism, and then we have tried to terpolymerize an $\alpha,\beta,\beta$-trifluoroacrylate, tetrafluoroethylene and an $\alpha$-olefin to obtain a copolymer comprising the backbone having retained therein the alternating structure of the "fluorine-containing olefin unit" (i.e. the $\alpha,\beta,\beta$-trifluoroacrylate unit and the tetrafluoroethylene unit) and the $\alpha$-olefin unit. This trial has been successful, and we have found a process of freely controlling the ester group content in fluorine-containing copolymer by changing arbitrarily the ratio of components ($\alpha,\beta,\beta$-trifluoroacrylate to tetrafluoroethylene) contained in the copolymer.

As is obvious from the above explanation, one object of the present invention is to provide a process for the production of a fluorine-containing copolymer having an arbitrary ester group content, said process being characterized in that tetrafluoroethylene, an $\alpha,\beta,\beta$-trifluoroacrylate and an $\alpha$-olefin are copolymerized with one another by the action of an initiator of radical polymerization. More particularly, the present invention is to provide a process for the production of a fluorine-containing polymer having an arbitrarily controlled ester group content, wherein the polymer retains the regular repeating sequential alternating structure between the "fluorine-containing olefin unit" (i.e. tetrafluoroethylene unit and $\alpha,\beta,\beta$-trifluoroacrylate unit) and the $\alpha$-olefin unit. This has become possible by changing the ratio of tetrafluoroethylene to an $\alpha,\beta,\beta$-trifluoroacrylate to be contained in the resulting copolymer which is prepared via radical mechanism. Thus, according to the process of the present invention, a fluorine-containing copolymer having theoretically contained therein the $\alpha,\beta,\beta$-trifluoroacrylate moiety in the range of from 0 to 50% by mole can be prepared.

The term "$\alpha,\beta,\beta$-trifluoroacrylate" herein used means an ester of $\alpha,\beta,\beta$-trifluoroacrylic acid which can be represented by the generic formula: $CF_2=CFCO_2C_nH_{2n+1}$ wherein n represents an integer of 1 or greater and representative examples thereof include methyl $\alpha,\beta,\beta$-trifluoroacrylate, ethyl $\alpha,\beta,\beta$-trifluoroacrylate, butyl $\alpha,\beta,\beta$-trifluoroacrylate and the like. These $\alpha,\beta,\beta$-trifluoroacrylates have, as mentioned previously, the trifluorovinyl group having the formula: $-CF=CF_2$ as one of the constitutional units thereof, which is also contained in the structure of tetrafluoroethylene having the formula: $CF_2=CF_2$ and they are strong electron acceptor monomers. It is well known that tetrafluoroethylene is a monomer which is easy to homopolymerize, but an $\alpha,\beta,\beta$-trifluoroacrylate is a monomer which is very difficult to homopolymerize. However, as mentioned previously, we have found that either of them is easy to copolymerize with an $\alpha$-olefin to form an alternating copolymer having the composition of 1:1 molar ratio.

The monomers' mixing ratio of tetrafluoroethylene to an $\alpha,\beta,\beta$-trifluoroacrylate which can be employed in the practice of the present invention can be selected arbitrarily from the range of 0 through 1 inclusive. Thus, the most suitable mixing ratio should be selected depending on the desired ester groups content in the resulting copolymer.

The term "$\alpha$-olefin" herein used means a compound having the generic formula:

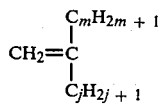

wherein j and m each independently represents an integer of 0 through 11 inclusive, and the representative examples thereof include ethylene, propylene, 1-butene, 1-pentene, 1-hexene, 1-heptene, 1-octene, 1-nonene, 1-decene, 1-undecene, 1-dodecene, 1-tridecene, isobutylene, 2-methyl-1-butene, 2-methyl-1-pentene, 2-methyl-1-hexene, 2-methyl-1-heptene, 2-methyl-1-octene and the like. The $\alpha$-olefins which can be used in the practice of the present invention should not be limited to only one. A mixture of two or more $\alpha$-olefins can be used at the same time without any trouble, providing they are selected properly considering the desired characteristic properties such as moldability, workability and the like of the resulting copolymer. Thus, it is possible to copolymerize mixtures of monomers such as tetrafluoroethylene/$\alpha,\beta,\beta$-trifluoroacrylate/ethylene/propylene, tetrafluoroethylene/$\alpha,\beta,\beta$-trifluoroacrylate/ethylene/propylene/isobutylene, or the like combinations.

The $\alpha$-olefin content in a mixture of monomers can be varied in the wide range extending from 1 to 99% by mole, but the range of 10 to 90% by mole is generally preferred.

Accordingly, there is produced in accordance with the present invention a fluorine-containing multi-component interpolymer of regular repeating sequential alternating structure of $-A_1-B_1-A_2-B_2-A_3-B_3-$, wherein $A_1$, $A_2$ and $A_3$ represent $\alpha$-olefin units and $B_1$, $B_2$ and $B_3$ represent $\alpha,\beta,\beta$-trifluoroacrylate and/or tetrafluoroethylene.

The process of the present invention can be practiced easily by reacting a mixture of tetrafluoroethylene, an $\alpha,\beta,\beta$-trifluoroacrylate and an $\alpha$-olefin in the absence of oxygen by the aid of a radical initiator, for example, by irradiation with gamma-rays or by the addition of a peroxide or an azo compound which can release radicals. Any temperature which is higher than the freezing points of the monomers can be employed as a temperature for the polymerization, though the temperature in the range of $-6°$ C. to $150°$ C. is preferred.

The initiator of polymerization which can be used in the practice of the present invention may be any of the above mentioned ionizing radiation such as alpha-rays, beta-rays, gamma-rays, electron beams, or the other radical initiators such as a peroxide and the like. Ultraviolet rays, light, supersonic waves can also be used. The use of gamma-rays is the most recommendable, since it enables one to effect the copolymerization at low temperature and low pressure with the best results.

The polymerization reaction according to the present invention does not require any dispersing medium such as a solvent or any stabilizer for dispersion such as an emulsifying agent, though of course such agents can be used if desired. That is, the polymerization according to the present invention can be carried out by any means selected from bulk polymerization, solution polymerization, emulsion polymerization and the like. It is also possible as occasion demands to use one or more known chain-transfer agents according to the conventional means for controlling molecular weight of the resulting copolymer.

When examined by means of infrared absorption spectrum method, the fluorine-containing copolymers prepared by the process of the present invention shows the absorption based on the presence of the C=O bond at 1780 cm$^{-1}$, the absorption based on the presence of the $CH_3$ group in the ester group at 1450 cm$^{-1}$, the absorption based on the presence of the C—F bond at 1300–1000 cm$^{-1}$. These results clearly show the presence of the $\alpha,\beta,\beta$-trifluoroacrylate unit and the tetrafluoroethylene unit in the copolymer, and it is found that the ratio of strength of absorption based on the C=O bond or the $CH_3$ group in the ester to the strength of absorption based on the C—F bond varies depending on the mixing ratio of tetrafluoroethylene monomer to $\alpha,\beta,\beta$-trifluoroacrylate monomer in the mixture of monomers.

On the other hand, the absorptions based on the C—H bond of an $\alpha$-olefin and an $\alpha,\beta,\beta$-trifluoroacrylate are observed at 3000 cm⁻¹ and 1400 cm⁻¹, etc., and the presence of the α-olefin unit in the copolymer is thereby recognized.

The ultimate analysis has also proved the presence of each of the elements C, H, F and O, and based on the results of this analysis, the ratio of components of the copolymer has been determined by calculation. It has been confirmed that the $\alpha,\beta,\beta$-trifluoroacrylate content in the resulting copolymer varies within the range of 0-60% by mole depending on the mixing ratio of tetrafluoroethylene to $\alpha,\beta,\beta$-trifluoroethylene in the mixture of monomers.

The invention will be further explained in more detail by the following examples. It will be understood that these examples are given merely for the purpose of illustration and the invention should not be limited by the same copolymer and the compositions thereof determined from said analytical results are also shown in the central columns in Table 1. The glass-transition temperatures and the temperatures of starting thermal decomposition in nitrogen current of the copolymers obtained under respective conditions are also shown in the right-hand columns in Table 1.

Each of the copolymers thus obtained was a hard and transparent solid, and the infrared absorption spectrum determined with respect to a test strip of the film of each copolymer showed the presence of the C—H bond at 1300-1000 cm⁻¹, the C═O radical at 1770 cm⁻¹ and the CH₃ radical in an ester at 1445 cm⁻¹. These results clearly show that the copolymers obtained comprise tetrafluoroethylene, methyl $\alpha,\beta,\beta$-trifluoroacrylate and ethylene.

TABLE 1

| Example No. | Amount of the mixture of monomers charged (grams) | Composition of the mixture of monomers (% by mole) | | | Yield of the copolymer (grams) | The element content in the copolymer (%) | | | Composition of the copolymer (% by mole) | | | Glass transition temperature of the copolymer (°C.) | Thermal decomposition starting temperature of the copolymer (°C.) |
|---|---|---|---|---|---|---|---|---|---|---|---|---|---|
| | | Tetrafluoroethylene | Methyl α,β,β-trifluoroacrylate | Ethylene | | C | H | F | Tetrafluoroethylene | Methyl α,β,β-trifluoroacrylate | Ethylene | | |
| 1. | 7.54 | 45.0 | 5.0 | 50.0 | 1.00 | 42.03 | 3.81 | 46.73 | 33.7 | 15.2 | 51.1 | — | 381 |
| 2. | 10.46 | 42.0 | 23.0 | 35.0 | 2.58 | 41.56 | 3.84 | 41.16 | 18.8 | 32.0 | 49.2 | — | — |
| 3. | 8.46 | 25.0 | 25.0 | 50.0 | 1.09 | 41.53 | 3.80 | 40.88 | 18.6 | 33.2 | 48.3 | — | — |
| 4. | 9.37 | 5.0 | 45.0 | 50.0 | 1.17 | 44.11 | 4.55 | 33.16 | 0.6 | 44.3 | 55.1 | 23 | 377 |
| 5. | 10.83 | 15.0 | 70.0 | 15.0 | 1.69 | 41.70 | 4.08 | 36.98 | 6.9 | 45.0 | 48.1 | — | — | these examples.

BRIEF EXPLANATION OF THE DRAWINGS

FIG. 3 shows infrared absorption spectrum obtained from a film of the copolymer after hydrolyzing treatment.

EXAMPLES 1-5

In a 10 ml capacity stainless steel autoclave was placed each of tetrafluoroethylene, methyl $\alpha,\beta,\beta$-trifluoroacrylate and ethylene according to the predetermined amounts as given in the left-hand columns in Table 1 below. Then, air within the autoclave was expelled by repeating three times the cycles consisting of freezing, solidifying, degassing and thawing before the reaction mixture was irradiated at 25° C. with gamma-rays from cobalt-60 at a dose rate of 0.5 Mrad/hr for 1 hour.

When irradiation was finished, unreacted tetrafluoroethylene and ethylene were removed by release and the remaining material was washed in a large amount of methanol to remove unreacted methyl $\alpha,\beta,\beta$-trifluoroacrylate from the copolymer by extraction.

The yields of the copolymers available after drying at reduced pressure, the results of the ultimate analysis of

EXAMPLES 6-9, REFERENCE EXAMPLES 1-2

Each of tetrafluoroethylene, methyl $\alpha,\beta,\beta$-trifluoroacrylate and propylene was charged in a 10 ml capacity stainless-steel autoclave, and air within the autoclave was expelled in the same manner as in Examples 1-5 followed by irradiating the reaction mixture at 25° C. with gamma-rays from cobalt-60 at a dose rate of 1.0 Mrad/hr for 6 hours.

The treatment after finishing the irradiation was the same as in Examples 1-5. The yield, the result of ultimate analysis and the composition determined thereby for each of the copolymers thus obtained are as given in the central columns in Table 2 below. The glass-transition temperature and the thermal decomposition starting temperature in nitrogen current for each of said copolymers are also shown in the right-hand columns in Table 2.

Figure 1:
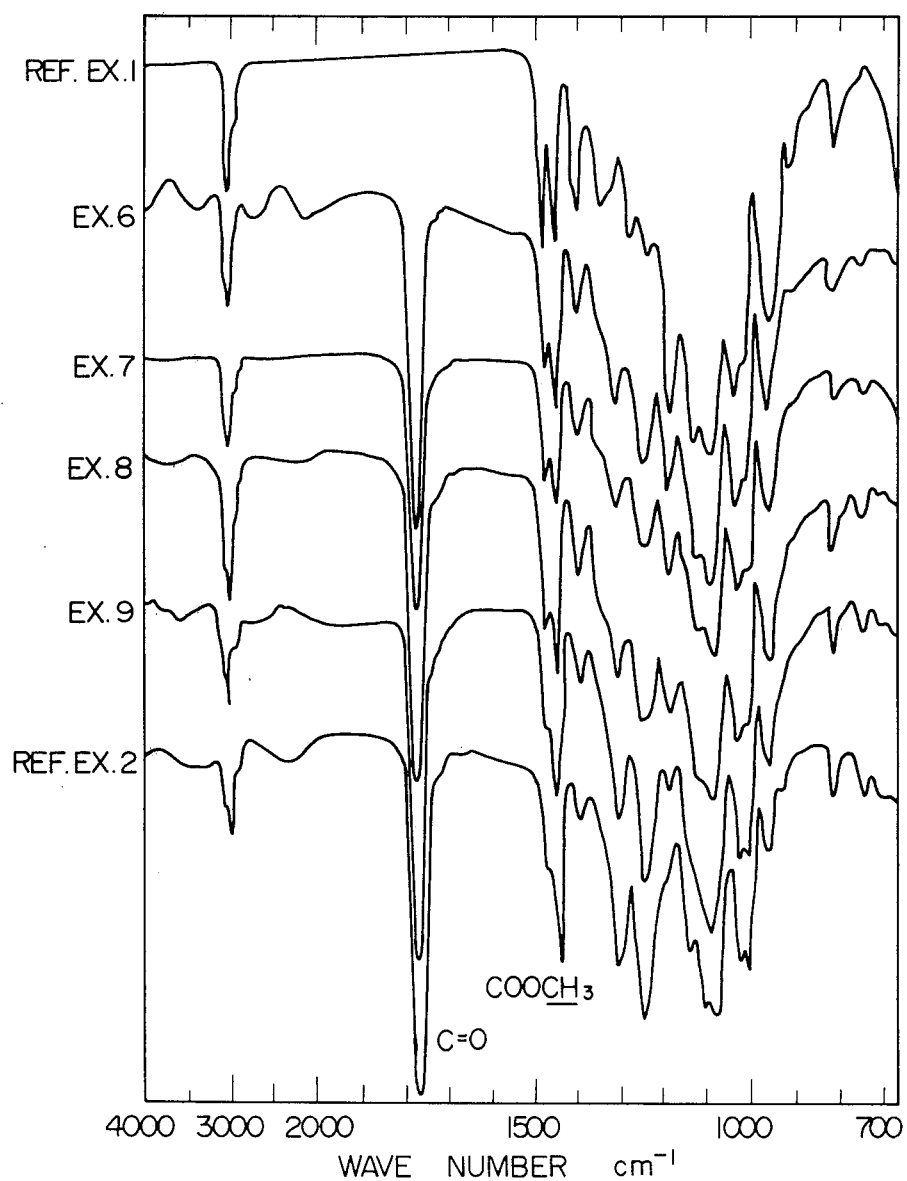
FIG. 1 shows infrared absorption spectrum obtained from a film of the copolymer prepared by the process of the present invention.

Each of the copolymers was a soft and transparent solid. The infrared absorption spectrum obtained from the film of each of the copolymers is as shown in FIG. 1. It is understood that the absorption at 3000 cm⁻¹ is ascribed to the C—H bond, the absorption at 1300-1000 cm⁻¹ to the C—F bond, the absorption at 1770 cm⁻¹ to the C═O bond, the absorption at 1445 cm⁻¹ to the CH₃ group in an ester, the absorption at 1470 cm⁻¹ to the CH₂ group and the absorption at 1390 cm⁻¹ to the CH₃ group. These results clearly show that the copolymers obtained are those which comprise tetrafluoroethylene, methyl $\alpha,\beta,\beta$-trifluoroacrylate and propylene.

TABLE 2

| Example No. or Reference Example No. | Amount of the mixture of monomers charged (grams) | Composition of the mixture of monomers (% by mole) | | | Yield of the copolymer (grams) | The element content in the copolymer (%) | | | Composition of the copolymer (% by mole) | | | Glass transition temperature of the copolymer (°C.) | Thermal decomposition starting temperature of the copolymer (°C.) |
|---|---|---|---|---|---|---|---|---|---|---|---|---|---|
| | | Tetra-fluoro-ethy-lene | Methyl α,β,β-tri-fluoro-Acry-late | Pro-pylene | | C | H | F | Tetra-fluoro-ethy-lene | Methyl α,β,β-tri-fluoro-acry-late | Pro-pylene | | |
| Ref. Ex. 1 | 6.80 | 50.0 | 0.0 | 50.0 | 1.80 | 52.45 | 4.56 | 43.58 | 47.5 | 0.0 | 52.5 | −5 | 405 |
| Ex. 6 | 6.99 | 45.0 | 5.0 | 50.0 | 2.24 | 48.39 | 4.65 | 44.00 | 41.1 | 6.7 | 52.2 | 3 | 405 |
| Ex. 7 | 7.18 | 40.0 | 10.0 | 50.0 | 2.19 | 44.67 | 4.64 | 41.38 | 27.0 | 22.1 | 50.9 | 11 | 373 |
| Ex. 8 | 7.37 | 35.0 | 15.0 | 50.0 | 3.15 | 45.19 | 5.05 | 40.84 | 25.8 | 22.0 | 52.2 | 17 | 395 |
| Ex. 9 | 8.14 | 15.0 | 35.0 | 50.0 | 5.71 | 46.27 | 5.14 | 33.36 | 7.1 | 41.3 | 51.6 | 8 | 360 |
| Ref. Ex. 2 | 17.80 | 0.0 | 50.0 | 50.0 | 11.77 | 46.66 | 5.52 | 31.18 | 0.0 | 49.1 | 50.9 | 21 | 362 |

EXAMPLES 10–14

Each of tetrafluoroethylene, methyl α,β,β-trifluoroacrylate and isobutylene was placed in a 10 ml capacity stainless-steel autoclave in the proportion as given in the left-hand columns in Table 3 below. In the same manner as in Examples 1–5 air in the autoclave was expelled and then irradiation was carried out at 25° C. with gamma-rays from cobalt-60 at a dose rate of 0.5 Mrad/hr for 1 hour.

When irradiation finished, the same treatment as in Examples 1–5 was repeated to obtain the copolymer. The yield, the result of ultimate analysis and composition of the copolymer determined thereby for each of the copolymers are as shown in the central columns in Table 3 below. The glass-transition temperature and the thermal decomposition starting temperature in nitrogen current for each of the copolymers thus prepared under various conditions are also shown in the right-hand columns in Table 3.

Each of the copolymers was a hard and transparent solid. The infrared absorption spectrum obtained from a strip of the film of each of the copolymers showed the presence of the C—H bond at 3000 cm$^{-1}$, the C—F bond at 1300–1000 cm$^{-1}$, the C═O group at 1770 cm$^{-1}$, the CH$_3$ group in an ester at 1445 cm$^{-1}$, and the CH$_3$ group at both 1410 cm$^{-1}$ and 1380 cm$^{-1}$. It was evident from these results that each of the copolymers thus obtained comprised tetrafluoroethylene, methyl, α,β,β-trifluoroacrylate and isobutylene.

In another aspect, the present invention also relates to a process for the production of cross-linked α,β,β-trifluoroacrylate/tetrafluoroethylene/α-olefin type multi-component copolymers. In more particular, the invention relates to a process for obtaining cross-linked, multi-component copolymers from α,β,β-trifluoroacrylate/tetrafluoroethylene/α-olefin type multi-component copolymers.

The terms "α,β,β-trifluoroacrylate" and "α-olefin" herein referred to are used in the same meanings as explained previously, respectively.

The present invention concerns a process for the production of cross-linked, fluorine-containing multi-component copolymers characterized in that α,β,β-trifluoroacrylate/tetrafluoroethylene/α-olefin type multi-component copolymers are irradiated with ionizing radiation in air or in an atmosphere of an inert gas such as nitrogen, helium, argon and the like to bring about cross-linking thereby.

In the course of study on α,β,β-trifluoroacrylate/tetrafluoroethylene/α-olefin type copolymers, we have found that these multi-component copolymers can be cross-linked in good efficiency by means of ionizing radiation. We have also found that such cross-linking can be brought about without the addition of any special cross-linking agent, and as a result the process enables the production of pure fluorine-containing cross-linked copolymers. We have also noticed that this process is applicable to fabricated articles, too, and then recognized its high availability in each field of industries for the production of medical materials, plastics, various membranes and the like. Based on such recognition, the above mentioned process of the present invention has been accomplished.

TABLE 3

| Example No. | Amount of the mixture of monomers charged (grams) | Composition of the mixture of monomers (% by mole) | | | Yield of the copolymer (grams) | The element content in the copolymer (%) | | | Composition of the copolymer (% by mole) | | | Glass transition temperature of the copolymer (°C.) | Thermal decomposition starting temperature of the copolymer (°C.) |
|---|---|---|---|---|---|---|---|---|---|---|---|---|---|
| | | Tetra-fluoro-ethy-lene | Methyl α,β,β-tri-fluoro-acry-late | Iso-buty-lene | | C | H | F | Tetra-fluoro-ethy-lene | Methyl α,β,β-tri-fluoro-acry-late | Iso-buty-lene | | |
| 10. | 9.14 | 45.0 | 5.0 | 50.0 | 0.24 | 47.72 | 5.46 | 43.59 | 42.0 | 8.1 | 51.9 | — | 377 |
| 11. | 7.72 | 15.0 | 15.0 | 70.0 | 0.23 | 47.80 | 5.50 | 32.26 | 8.2 | 42.8 | 49.1 | — | — |
| 12. | 9.60 | 35.0 | 15.0 | 50.0 | 0.28 | 47.58 | 5.44 | 37.46 | 23.8 | 26.2 | 50.0 | — | 355 |
| 13. | 10.06 | 25.0 | 25.0 | 50.0 | 0.42 | 48.54 | 5.75 | 34.75 | 17.7 | 30.3 | 52.1 | 57 | 338 |
| 14. | 10.97 | 5.0 | 45.0 | 50.0 | 0.39 | 48.99 | 5.72 | 29.07 | 0.2 | 49.0 | 50.8 | 76 | 347 |

The α,β,β-trifluoroacrylate/tetrafluoroethylene/α-olefin type multi-component copolymers useful in the practice of the present invention should not be limited to the products of special processes. Any of the copolymers prepared in the presence of known radical initiators such as benzoyl peroxide, ammonium persulfate, azobisisobutyronitrile and the like, or the copolymers prepared by exposing to ionizing radiation such as gamma-rays, alpha-rays, beta-yats, electron beams and the like can be used. Of course such copolymers as those prepared by the method of bulk polymerization, solution polymerization, emulsion polymerization, suspension polymerization or the like can also be used.

The α,β,β-trifluoroacrylate/tetrafluoroethylene/α-olefin type multi-component copolymers useful in the practice of the invention comprise at least three monomers selected from the above given types. Those which consist of four or more component monomers contain one or two or more α,β,β-trifluoroacrylate, one or two or more α-olefin and tetrafluoroethylene. In the case of terpolymers useful in our invention, the ratio of the α,β,β-trifluoroacrylate component to the tetrafluoroethylene component in each terpolymer is not limited to any specific range. However, the terpolymers useful in our invention always contain 40-60% by mole of an α-olefin component and the remaining portion corresponding to 60 to 40% by mole is occupied by the sum of an α,β,β-trifluoroacrylate component and tetrafluoroethylene component. Thus, the terpolymer generally means a copolymer having a rather explicit alternating structure consisting of the fluoroethylene unit and the α-olefin unit. As regards the four or more multi-component copolymers, the term "multi-component copolymer" is used to mean a copolymer consisting of one or the plural number of α,β,β-trifluoroacrylate; the plural number or one of α-olefin; and tetrafluoroethylene. There is no specific limitation with respect to the ratio of components among the plural number of α,β,β-trifluoroacrylates, the ratio of components between α,β,β-trifluoroacrylate and tetrafluoroethylene, and the ratio of components among the plural number of α-olefins. However, the term "multi-component copolymer" herein used generally means a copolymer which contains 40-60% by mole of an α-olefin or α-olefins in total, wherein the remaining portion corresponding to 60-40% by mole is occupied by the sum of α,β,β-trifluoroacrylates and tetrafluoroethylene. Namely, the term is used to mean a copolymer having the fluoroolefin component(s) and the α-olefin component(s) in the molar ratio of 1:1 in the form of explicit alternating structure.

Ionizing radiation useful in the practice of the present invention includes gamma-rays, X-rays, alpha-rays, beta-rays, electron beams and the like, but gamma-rays and electron beams are the most preferred. Irradiation with these sources for a total dose of up to 120 Mrads generally provides satisfactory results.

According to the process of the present invention, multi-component copolymers in any form such as in powder, pellet, liquid, or in any molded or fabricated form such as in the form of film, sheet, block or the like can be subjected to ionizing radiation in air or in an inert gas atmosphere such as in nitrogen, helium, argon or the like. The crosslinking reaction in the process of our invention proceed very well even at around room temperature. Thus, there is no need to limit the temperature at which irradiation should be effected. Generally the temperature can be selected arbitrarily from the range of $-78°$ C. through 150° C. inclusive. Formulating ingredients such as carbon black or any of the various adding agents can be added to the multi-component copolymers if desired.

EXAMPLE 15

A terpolymer comprising 24.6% by mole of methyl α,β,β-trifluoroacrylate, 20.2% by mole of tetrafluoroethylene and 55.2% by mole of ethylene was molded by hot press at 180° C. into a sheet 1 mm thick, which was exposed to ionizing radiation in air at room temperature. As a radiation source, electron beams with an energy of 2.0 MeV and a flux density of 0.4 $\mu A/cm^2$ generated from a resonance transfer-type electron beam accelerator was used. When irradiation was finished, the copolymer was extracted by dimethylformamide at 80° C. to determine the gel fraction (% by weight) from the unextracted residue of the copolymer. The gel fraction shows the degree of cross-linking. The data of gel fraction thus determined are as shown in Table 4 below.

EXAMPLE 16

A terpolymer comprising 24.5% by mole of methyl α,β,β-trifluoroacrylate, 25.7% by mole of tetrafluoroethylene and 49.8% by mole of propylene was molded by hot press at 140° C. into a sheet 1 mm thick, which was subjected to electron beams irradiation in air at room temperature in the same manner as in Example 15. The copolymer after irradiation was extracted by tetrahydrofuran at 76° C. to determine the gel fraction. The results are as shown in Table 4 below.

TABLE 4

| | Gel fraction (% by weight) | | | | |
|---|---|---|---|---|---|
| Total dose | No irradiation | 20 Mrad | 40 Mrad | 60 Mrad | 180 Mrad |
| Example 15 | 0 | 36.2 | 58.2 | 71.0 | 87.9 |
| Example 16 | 0 | 33.1 | 69.5 | 82.4 | 94.9 |

EXAMPLE 17

A four-component copolymer comprising 25% by mole of methyl α, β,β-trifluoroacrylate, 26% by mole of tetrafluoroethylene, 12% by mole of ethylene and 37% by mole of propylene was molded by hot press at 180° C. into a sheet 1 mm thick, which was subjected to electron beams irradiation for a total dose of 60 Mrads in the same manner as in Example 15. The copolymer obtained after said irradiation did not dissolve in tetrahydrofuran, acetone, dimethylformamide, benzotrifluoride or benzene, while the unirradiated copolymer dissolved.

In further aspect, the present invention relates to a process for the production of fluorine-containing ion exchangers. In particular, the invention relates to a process for the production of ion exchangers characterized in that a terpolymer or a multi-component copolymer comprising four or more component monomers each comprising tetrafluoroethylene, one or two or more α,β,β-trifluoroacrylate having the generic formula: $CF_2CFCOOC_nH_{2n+1}$ wherein n is an integer of 1 or greater, and one or more α-olefin having the generic formula:

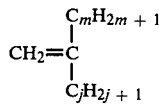

wherein j and m each independently represents an integer of 0 through 11 inclusive, or a cross-linked product of said terpolymer or said multi-component copolymer is subjected to hydrolyzing treatment to convert ester groups contained in the $\alpha,\beta,\beta$-trifluoroacrylate unit in each of said copolymers.

Recently, ion exchangers are used in the forms of ion-exchange membranes or ion-exchange resin particles in various fields of industries such as, for example, in the processes of desalting sea water, the thickening of a solution of sodium chloride, and the like electrodialysis treatments, or in the separation treatments such as the electrolysis of various salts, or as separators such as a battery membrane. As a result, ion exchangers are requested to possess more and more complicated and higher levels of characteristic properties. In spite of all these requirements, however, no products are available which satisfy all of such requirements as excellent selectivity, resistance to heat and chemicals, low electrical resistance, and the like.

We have paid special attention to the fact that fluorine-containing polymers generally possess excellent resistance to both heat and chemicals and based on such recognition we have long been studying to find a method of giving ion exchange ability to such fluorine-containing polymers. Finally, we have accomplished the present invention which enables the production of fluorine-containing ion exchangers having excellent resistance to both heat and chemicals as well as having low electrical resistance.

The fluorine-containing multi-component copolymers which can be used in the practice of the present invention as a starting material are the special polymers which can be produced by the process of our another invention which is described hereinbefore (Japanese Patent Application No. 53-128206). The special polymers are multi-component copolymers having high degree of alternating structure of a fluorine-containing olefin unit (tetrafluoroethylene and one or two or more $\alpha,\beta,\beta$-trifluoroacrylate) and an $\alpha$-olefin unit (one or two or more $\alpha$-olefin) in the ratio of approximately 1:1. The ester groups content of these copolymers can be varied easily by changing the ratio of tetrafluoroethylene to an $\alpha,\beta,\beta$-trifluoroacrylate in a mixture of monomers to be polymerized. It is also possible to obtain the products having various properties and fabricabilities depending on the specific $\alpha$-olefin used, or by changing the ratio of different $\alpha$-olefins to be mixed with one another when a plural number of $\alpha$-olefins are used.

When the above mentioned invention (Japanese Patent Application No. 128206) was accomplished, it was impossible to control the ester groups content or the fabricability of the resulting copolymer because of the strong alternatingly copolymerizing trend between an $\alpha,\beta,\beta$-trifluoroacrylate and an $\alpha$-olefin. Now it has become possible to control such matters according to the process of our later invention which is characterized in that the fluorine-containing multi-component copolymers prepared by the process of our earlier invention (Japanese Patent Application No. 128206) are used as a starting material. In particular, the copolymers are subjected to hydrolysis to convert ester groups contained therein into carboxyl groups. This process enables the production of fluorine-containing copolymers having various carboxyl groups content and various degrees of resistance to heat and chemicals.

The term "$\alpha,\beta,\beta$-trifluoroacrylate" herein used means an ester of an $\alpha,\beta,\beta$-trifluoroacrylic acid having the generic formula: $CF_2=CFCOOC_nH_{2n+1}$ wherein n represents an integer of 1 or greater, which is described in detail hereinbefore. The term "$\alpha$-olefin" herein used means a compound having the generic formula:

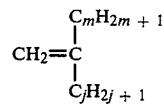

wherein j and m each independently represents an integer of 0 through 11 inclusive, which is also described in detail hereinbefore.

The hydrolysis of the fluorine-containing multi-component copolymers according to the present invention can be carried out easily by any of the known or conventional means for hydrolysis, though the treatment in an aqueous basic solution such as a solution of KOH or NaOH is preferred. That is, the ester groups ($-COOC_nH_{2n+1}$) contained in the raw material copolymer are made to react with said aqueous basic solution to convert the copolymer into a corresponding salt of carboxylic acid, or subsequently it is made to react with a strong inorganic acid such as HCl to convert into a corresponding carboxylic acid. In order to improve the contact of the aqueous basic solution with the raw material copolymer, a water-soluble organic solvent having an affinity with the raw material copolymer such as methanol, acetone, tetrahydrofuran or the like can be added advantageously, though such addition is not always necessary.

The hydrolysis treatment can be effected at various temperatures, but preferably temperatures below the boiling point of the treating aqueous solution are employed. The hydrolysis reaction can be promoted by agitation, though such agitation is not always necessary. For example, the mere boiling of the treating aqueous solution which contains the raw material copolymer, or the mere placement of the copolymer in the treating solution which is circulating is satisfactory.

There is no limitation with respect to the shapes of the copolymers. Copolymers either before or after molding, or copolymers either before or after cross-linking can be used without any trouble. For example, if an ion-exchange membrane is desired, hydrolysis can be carried out either before or after making a membrane, or either before or after cross-linking. Generally, it is preferred to hydrolyze before making a membrane or cross-linking, though it is of course possible to hydrolyze after making a membrane or cross-linking. Depending on the desired properties or the end use of the product, sometimes cross-linking can be omitted.

When uncross-linked copolymers, particularly those having high ester groups content are used, the copolymers reach the state dissolved in the solution after hydrolysis. For removing the resulting copolymer having ion-exchange groups from said solution, various means such as the addition of acid, evaporation to dryness, re-precipitation in a suitable solvent or the like can be employed, though the addition of acid to precipitate the copolymer is the most easy and recommendable.

The ion exchangers according to the present invention not only possess superior resistance to heat and chemicals but also possess satisfactory mechanical strength and low electrical resistance. An ion-exchange membrane prepared therefrom can be used as a useful membrane in various fields of industries such as the desalting of sea water, electrolysis of various salts, cell industry, atomic industry, medical material industry and the like.

The invention will be illustrated in more detail by the following examples.

EXAMPLE 18

A terpolymer comprising 28% by mole of methyl $\alpha,\beta,\beta$-trifluoroacrylate, 22% by mole of tetrafluoroethylene and 50% by mole of ethylene in an amount of 2.0 g was boiled in a mixed solution comprising 15 ml of water, 45 ml of methyl alcohol and 5 g of NaOH under reflux for 5 hours. When boiling was stopped, most portion of the raw material terpolymer was severely swollen with the treating solution. Then, concentrated hydrochloric acid was added by dropwise to the mixture of the raw material and the treating solution to thereby convert the copolymer into acid form to separate from the solution by precipitation. Yield of the copolymer product was 1.8 g. The withdrawn copolymer was pale yellow and hygroscopic. This was dissolved in a polar solvent such as tetrahydrofuran, acetone or methyl alcohol which did not dissolve the raw material ester-type copolymer. The withdrawn acid-type copolymer was severely swollen with or dissolved in an aqueous solution of NaOH when placed therein. The COOH content in the copolymer obtained by calculation from the results of back titration with acid was 2.9 meq/g-polymer. The weight reduction of the withdrawn acid-type copolymer by thermal decomposition in air was determined by thermobalance with temperature rising at a rate of 5° C./min. At 110° C., the desorption of absorbed water was observed, and at temperatures between 250° C. and 355° C., clear weight reduction was observed. The acid-type copolymer was made into a sheet by hot press at 180° C., and the sheet was subjected to electron beams irradiation in air with electron beams with an energy of 2 MeV and 1 mA for a total dose of 30 Mrads. The cross-linked sheet thus obtained was placed in water for a whole day and night at room temperature. The ratio of weight increase due to the swelling with water was 11%.

The electrical resistance of the ion-exchange membrane 150μ thick thus obtained determined at 25° C. in an aqueous solution of NaOH (2.0-N) was 16.2 Ω·cm².

EXAMPLE 19

A 1.0 g portion of a terpolymer comprising 22% by mole of methyl $\alpha,\beta,\beta$-trifluoroacrylate, 27% by mole of tetrafluoroethylene and 51% by mole of propylene was boiled in a mixed solution comprising 15 ml of water, 45 ml of methyl alcohol and 5 g of NaOH under reflux for 5 hours. Then, the same treatment as in Example 18 was repeated. 0.72 g Of an acid-type copolymer was obtained.

The COOH content in the copolymer determined in the same manner as in Example 18 was 3.5 meq/g-polymer. The weight reduction of the withdrawn acid-type copolymer by thermal decomposition in air was determined. The desorption of water was observed at 109° C., and the significant weight reduction was observed at temperatures between 252° C. and 330° C.

This acid-type copolymer was made into a sheet by hot press at 140° C. and the resulting sheet was subjected to electron beams in air with an energy of 2 MeV and 1 mA for a total dose of 30 Mrads to cross-link. The resulting cross-linked copolymer was placed in water for a whole day and night. The weight increase by swelling with water was 50%.

The electrical resistance of the sheet of ion-exchange membrane 100μ thick thus obtained determined at 25° C. in a 2.0-N aqueous solution of NaOH was 0.5 mΩ·cm².

EXAMPLE 20

1.0 g Of a terpolymer comprising 30% by mole of methyl $\alpha,\beta,\beta$-trifluoroacrylate, 19% by mole of tetrafluoroethylene and 51% by mole of propylene was boiled in a mixed solution comprising 15 ml of water, 45 ml of methyl alcohol and 5 g of NaOH under reflux for 5 hours. After this boiling, the same treatment as in Example 18 was repeated to withdraw 0.84 g of an acid-type copolymer.

The COOH content in the copolymer determined in the same manner as in Example 18 was 5.2 meq/g-polymer. The weight reduction of the withdrawn acid-type copolymer by thermal decomposition in air was measured in the same manner as in Example 18. The desorption of water was observed at 112° C. and significant weight decrease was observed at temperatures between 250° C. and 325° C. The ratio of weight increase by swelling with water of the sheet of cross-linked copolymer determined in the same manner as in Example 19 was 190%.

The electrical resistance of the ion-exchange membrane 100μ thick determined at 25° C. in a 2.0-N aqueous solution of NaOH was 0.055 Ω·cm².

EXAMPLE 21

2.0 g Of a four-component copolymer comprising 25% by mole of methyl $\alpha,\beta,\beta$-trifluoroacrylate, 26% by mole of tetrafluoroethylene, 12% by mole of ethylene and 37% by mole of propylene was boiled in a mixed solution comprising 15 ml of water, 45 ml of methyl alcohol and 5 g of NaOH under reflux for five hours. After this boiling, the same treatment as in Example 18 was repeated to provide an acid-type copolymer in an amount of 1.85 g.

The COOH content in the copolymer determined in the same manner as in Example 18 was 3.2 meq/g-polymer. When the weight decrease of the recovered acid-type copolymer due to thermal decomposition in air was measured, the desorption of water was observed at 112° C. and clear weight decrease was observed at temperatures between 258° C. and 390° C. The ratio of weight increase by swelling with water of the cross-linked sheet of the acid-type copolymer determined in the same manner as in Example 19 was 310%.

The electrical resistance of the ion-exchange membrane 100μ thick determined at 25° C. in a 2.0-N aqueous solution of NaOH was 0.011 Ω·cm².

EXAMPLES 22–25, REFERENCE EXAMPLES 3–4

The terpolymers comprising methyl $\alpha,\beta,\beta$-trifluoroacrylate, tetrafluoroethylene and propylene each having the ratio of components as shown in the central columns in Table 5 were subjected to hydrolyzing treatment in the same manner as in Example 18 and the COOH content in each of the resulting copolymers was determined. The results are shown in the right-hand columns in Table 5.

Figure 2:
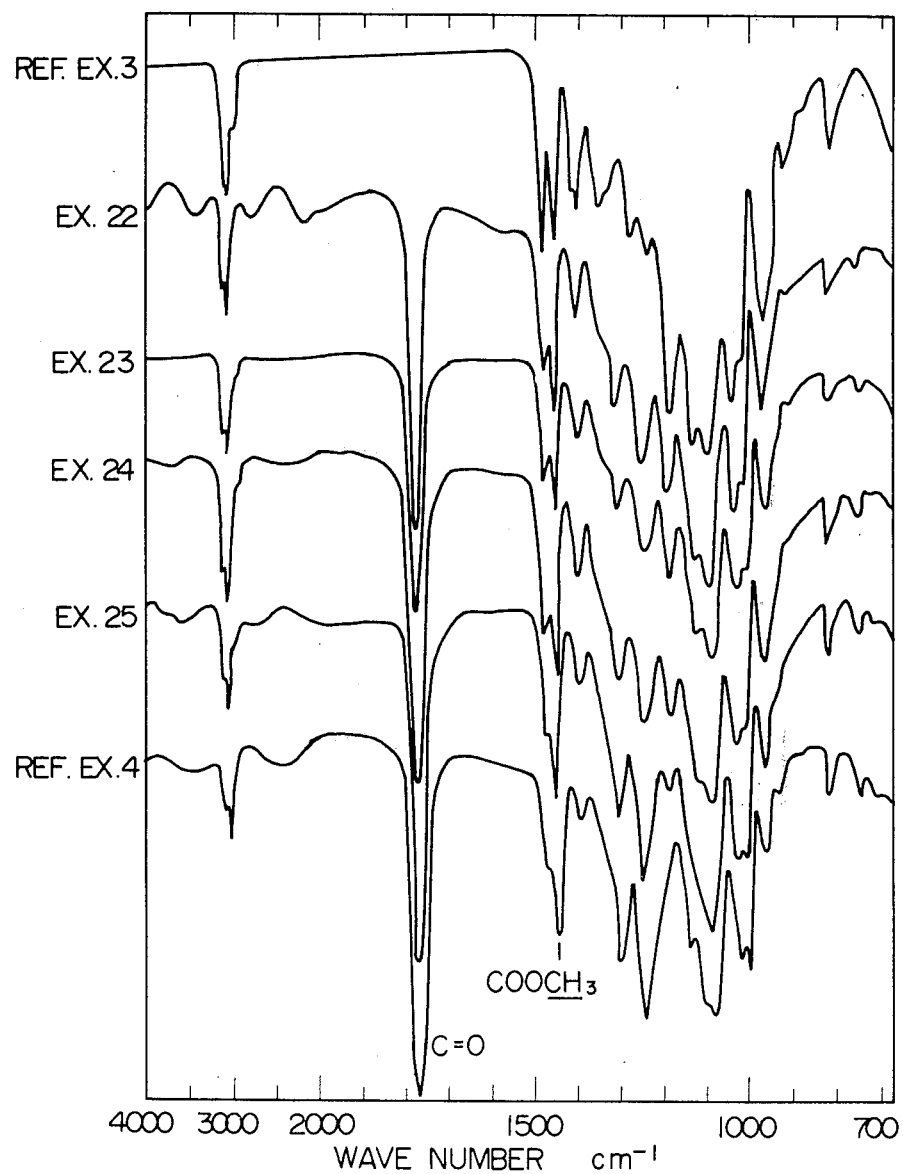
FIG. 2 shows infrared absorption spectrum obtained from a film of the copolymer before hydrolyzing treatment.

Infrared absorption spectrum obtained from each film of the copolymers having ester groups in the side chains before hydrolyzing treatment is shown in FIG. 2. Infrared absorption spectrum obtained from each film of the copolymers after hydrolyzing treatment is shown in Table 5. The infrared absorption spectrum of the copolymers before hydrolysis (shown in FIG. 2) shows the absorption due to the presence of C=O in an ester group at 1780 cm$^{-1}$, and the absorption due to the presence of CH$_3$ in an ester group at 1450 cm$^{-1}$, while infrared spectrum of the copolymers after hydrolysis (shown in FIG. 3) shows the new absorption due to the presence of OH group near 3300 cm$^{-1}$ and the absorption due to CH$_3$ in the ester group (at 1450 cm$^{-1}$) disappears. The absorption at 1780 cm$^{-1}$ due to C=O becomes broad. These results of infrared absorption spectrum analysis clearly show that the ester groups contained in the original terpolymer have been converted to carboxylic groups by the treatment of boiling in a solution of NaOH.

TABLE 5

| Example No. or Reference Example No. | Copolymers before hydrolyzing treatment Ratio of components (% by mole) | | | Amount treated (g) | Copolymers after hydrolyzing treatment | |
|---|---|---|---|---|---|---|
| | Methyl $\alpha,\beta,\beta$-trifluoro-acrylate | Tetrafluoro-ethylene | Propylene | | Yield (g) | COOH content (meq/g) |
| Ref. Ex. 3 | 0.0 | 47.5 | 52.5 | 3.2 | 3.1 | 0.00 |
| Ex. 22 | 6.7 | 41.1 | 52.2 | 1.8 | 1.7 | 0.57 |
| Ex. 23 | 22.1 | 27.0 | 50.9 | 2.1 | 1.9 | 3.45 |
| Ex. 24 | 22.0 | 25.8 | 52.2 | 1.6 | 1.4 | 3.67 |
| Ex. 25 | 41.3 | 7.1 | 51.6 | 2.6 | 2.1 | 5.15 |
| Ref. Ex. 4 | 49.1 | 0.0 | 50.9 | 2.2 | 1.8 | 5.50 |

In further aspect, the present invention relates to a process for the production of cross-linked products of hydrolyzed tetrafluoroethylene/$\alpha,\beta,\beta$-trifluoroacrylate/$\alpha$-olefin type multi-component copolymers. In particular, the invention relates to a process for the production of cross-linked products of said hydrolyzed multi-component copolymers which have become available according to one of our inventions.

The tetrafluoroethylene/$\alpha,\beta,\beta$-trifluroacrylate/$\alpha$-olefin type multi-component copolymers are the multi-component alternating copolymers having the ratio of components of 1:1 with respect to the fluorine-containing olefin (i.e. tetrafluoroethylene and $\alpha,\beta,\beta$-trifluoroacrylate) unit and the $\alpha$-olefin (i.e. one or two or more of $\alpha$-olefin) unit. The ester groups content in said copolymer can be varied easily by changing the ratio of tetrafluoroethylene to an $\alpha,\beta,\beta$-trifluoroacrylate in the mixture of monomers. These copolymers can easily be hydrolyzed to be converted into the copolymers having carboxylic groups in side chains. The present invention concerns a process for cross-linking said hydrolyzed multi-component copolymers having carboxylic groups in side chains.

The term "$\alpha,\beta,\beta$-trifluoroacrylate" herein used means an ester of $\alpha,\beta,\beta$-trifluoroacrylic acid having the generic formula: CF$_2$=CFCOOC$_n$H$_{2n+1}$ wherein n represents an integer of 1 or greater, which is described in more detail hereinbefore. The term "$\alpha$-olefin" herein used means a compound having the generic formula:

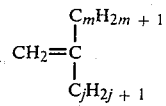

wherein j and m each represents independently an integer of 0 through 11 inclusive, which is also described in more detail hereinbefore.

The present invention provides a process for the production of cross-linked fluorine-containing polymers having carboxylic groups in side chains characterized in that the hydrolyzed tetrafluoroethylene/$\alpha,\beta,\beta$-trifluoroacrylate/$\alpha$-olefin type multi-component copolymers are exposed to ionizing radiation in air or in an atmosphere of inert gas such as nitrogen, helium, argon, etc. to cross-link.

In the course of study on the multi-component tetrafluoroethylene/$\alpha,\beta,\beta$-trifluoroacrylate/$\alpha$-olefin type copolymers, we have tried to irradiate the hydrolyzed products of said copolymers with ionizing radiation and have found that these copolymers can be cross-linked in good efficiency to be strengthened. We have recognized that this can provide a very effective means applicable to various industrial purposes. For example, if said type of copolymer is used as an ion-exchange membrane, the strengthening of the membrane and the improvement in the insolubility of said membrane against a specific solvent such as water can be accomplished very conveniently by making use of the above mentioned process. Based on such discovery, our invention has been completed.

Ionizing radiation available in the practice of our invention includes gamma-rays, X-rays, alpha-rays, beta-rays, electron beams and the like, though gamma-rays and electron beams are the most preferred. Irradiation for a dose of up to 120 Mrads, with the actual dose being properly selected depending on the purpose, generally ensures the acceptable results.

The process of the present invention can be practiced by irradiating said copolymer in an arbitral form such as powder, particle, liquid, or film, sheet, block and the like with ionizing radiation in air, or in vacuum, or in an atmosphere of inert gas such as nitrogen, helium, argon and the like. This cross-linking reaction can proceed in good efficiency even at around room temperature. Thus, there is no specific limitation with respect to temperatures, though the temperature in the range of $-78°$ to 150° C. is generally preferred. The addition of a filler or an ingredient such as carbon black to the copolymer before irradiation can be effected if desired, though, of course, such is not necessary.

The invention will be explained in more detail by the following examples.

EXAMPLE 26

A copolymer having carboxylic groups in side chains prepared by the hydrolysis of a terpolymer comprising 13.0% by mole of methyl, $\alpha,\beta,\beta$-trifluoroacrylate, 35% by mole of tetrafluoroethylene and 52% by mole of propylene was molded by hot press at 150° C. into a sheet 1 mm thick, which was exposed to ionizing radiation in air at room temperature. As a radiation source, electron beams with an energy of 2.0 MeV and a flux density 0.4 μA/cm² from the resonance transformer type electron beam accelerator was used. When irradiation was finished, the copolymer was boiled in tetrahydrofuran to extract the sol portion thereof. The gel fraction (% by weight) was determined from the amount of unextracted residue. The gel fraction shows the degree of cross-linking. Results are as shown in Table 6.

EXAMPLE 27

A copolymer having carboxylic groups in side chains prepared by hydrolysis of a four-component polymer comprising 33.0% by mole, 16.0% by mole of tetrafluoroethylene, 38.0% by mole of ethylene and 13.0% by mole of propylene was molded by hot press at 180° C. into a sheet 1 mm thick. The sheet thus obtained was treated in the same manner as in Example 26. Results of the gel fraction are as shown in Table 6 below.

TABLE 6

| | Gel fraction (% by weight) | | | |
|---|---|---|---|---|
| | No irradiation | 10 Mrads | 30 Mrads | 60 Mrads |
| Example 26 | 0 | 9.5 | 64.8 | 81.6 |
| Example 27 | 0 | 10.9 | 65.1 | 89.8 |

What we claim is:

1. A process for the production of a fluorine-containing interpolymer of regular repeating sequential alternating structure $-A_1-B_1-A_2-B_2-A_3-B_3-$ having ion exchange groups characterized in that a terpolymer or a multi-component copolymer comprising four or more component monomers; or a cross-linked copolymer of said terpolymer or said multi-component copolymer; is subjected to hydrolyzing treatment, said terpolymer or said multi-component copolymer comprising tetrafluoroethylene; up to 60 mole % of one or more $\alpha, \beta, \beta$-trifluoroacrylate having the generic formula $CF_2=CFCOOC_nH_{2n+1}$ wherein n represents an integer of 1-4; and from 10-90 mole % of one or more $\alpha$-olefin having the generic formula:

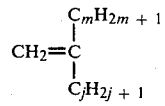

wherein j and m each independently represents an integer of 0 through 11 inclusive, and wherein $A_1$, $A_2$ and $A_3$ represent said $\alpha$-olefin and $B_1$, $B_2$ and $B_3$ represent said tetrafluoroethylene and said $\alpha,\beta,\beta$-trifluoroacrylate.

2. The process as defined in claim 1 wherein said $\alpha,\beta,\beta$-trifluoroacrylate is methyl $\alpha,\beta,\beta$-trifluoroacrylate.

3. The process as defined in either of claims 1 or 2 wherein the terpolymer which contains ethylene as an $\alpha$-olefin component or the cross-linked product of said terpolymer is used as a starting material.

4. The process as defined in any of claims 1 or 2 wherein the terpolymer which contains propylene as an $\alpha$-olefin component or the cross-linked product of said terpolymer is used as a starting material.

5. The process as defined in any of claims 1 or 2 wherein the terpolymer which contains isobutylene as an $\alpha$-olefin component or the cross-linked product of said terpolymer is used as a starting material.

6. The process as defined in any of claims 1 or 2 wherein the four-component copolymer which contains both ethylene and propylene as $\alpha$-olefin components or the cross-linked product of said four-component copolymer is used as a starting material.

7. The process as defined in any of claims 1 or 2 wherein the four-component copolymer which contains both ethylene and isobutylene as $\alpha$-olefin components or the cross-linked product of said four-component copolymer is used as a starting material.

8. The process as defined in any of claims 1 or 2 wherein the four component copolymer which contains both propylene and isobutylene as $\alpha$-olefin components or the cross-linked product of said four component copolymer is used as a starting material.

9. The process as defined in any of claims 1 or 2 wherein the five-component copolymer which contains ethylene, propylene and isobutylene as $\alpha$-olefin components or the cross-linked product of said five-component copolymer is used as a starting material.

10. The process as defined in claim 1 wherein said $\alpha,\beta,\beta$-trifluoroacrylate is ethyl $\alpha,\beta,\beta$-trifluoroacrylate.

11. The process as defined in claim 1 or claim 10 wherein the terpolymer which contains ethylene as an $\alpha$-olefin component or the cross-linked product of said terpolymer is used as a starting material.

12. The process as defined in claim 1 or claim 10 wherein the terpolymer which contains propylene as an $\alpha$-olefin component or the cross-linked product of said terpolymer is used as a starting material.

13. The process as defined in claim 1 or claim 10 wherein the terpolymer which contains isobutylene as an $\alpha$-olefin component or the cross-linked product of said terpolymer is used as a starting material.

14. The process as defined in claim 1 or claim 10 wherein the four-component copolymer which contains both ethylene and propylene as $\alpha$-olefin components or the cross-linked product of said four-component copolymer is used as a starting material.

15. The process as defined in claim 1 or claim 10 wherein the four-component copolymer which contains both ethylene and isobutylene as $\alpha$-olefin components or the cross-linked product of said four-component copolymer is used as a starting material.

16. The process as defined in claim 1 or claim 10 wherein the four-component copolymer which contains both propylene and isobutylene as $\alpha$-olefin components or the cross-linked product of said four-component copolymer is used as a starting material.

17. The process as defined in claim 1 or claim 10 wherein the five-component copolymer which contains ethylene, propylene and isobutylene as $\alpha$-olefin components or the cross-linked product of said five-component copolymer is used as a starting material.

18. The process as defined in claim 1 wherein said $\alpha,\beta,\beta$-trifluoroacrylate is butyl $\alpha,\beta,\beta$-trifluoroacrylate.

19. The process as defined in claim 1 or claim 18 wherein the terpolymer which contains ethylene as an α-olefin component or the cross-linked product of said terpolymer is used as a starting material.

20. The process as defined in claim 1 or claim 18 wherein the terpolymer which contains propylene as an α-olefin component or the cross-linked product of said terpolymer is used as a starting material.

21. The process as defined in claim 1 or claim 18 wherein the terpolymer which contains isobutylene as an α-olefin component or the cross-linked product of said terpolymer is used as a starting material.

22. The process as defined in claim 1 or claim 18 wherein the four-component copolymer which contains ethylene and propylene as α-olefin components or the cross-linked product of said four-component copolymer is used as a starting material.

23. The process as defined in claim 1 or claim 18 wherein the four-component copolymer which contains ethylene and isobutylene as α-olefin components or the cross-linked product of said four-component copolymer is used as a starting material.

24. The process as defined in claim 1 or claim 18 wherein the four-component copolymer which contains propylene and isobutylene as α-olefin components or the cross-linked product of said four-component copolymer is used as a starting material.

25. The process as defined in claim 1 or claim 18 wherein the five-component copolymer which contains ethylene, propylene and isobutylene as α-olefin components or the cross-linked product of said five-component copolymer is used as a starting material.

26. The process as defined in claim 1 wherein the multi-component copolymer comprising four or more component monomers including both methyl α,β,β-trifluoroacrylate and ethyl α,β,β-trifluoroacrylate as α,β,β-trifluoroacrylate components or the cross-linked copolymer of said multi-component copolymer is used as a starting material.

27. The process as defined in claim 1 wherein the multi-component copolymer comprising four or more component monomers including both ethyl α,β,β-trifluoroacrylate and butyl α,β,β-trifluoroacrylate as α,β,β-trifluoroacrylate components or the cross-linked copolymer of said multi-component copolymer is used as a starting material.

28. The process as defined in claim 1 wherein the multi-component copolymer comprising five or more component monomers including methyl α,β,β-trifluoroacrylate, ethyl α,β,β-trifluoroacrylate and butyl α,β,β-trifluoroacrylate as α,β,β-trifluoroacrylate component or the cross-linked copolymer of said multi-component copolymer as a starting material.

29. The process as defined in claim 1 wherein the hydrolyzing treatment is carried out in an aqueous basic solution.

30. The process as defined in claim 29 wherein said aqueous basic solution is a solution of LiOH, KOH, NaOH, or NH$_4$OH.

31. The process as defined in claim 1 wherein the hydrolyzing treatment is carried out in an aqueous acidic solution.

32. The process as defined in claim 30 wherein said aqueous acidic solution is a solution of HCl, H$_2$SO$_4$, HNO$_3$ or CH$_3$COOH.

33. A process for the production of a cross-linked fluorine-containing polymer of regular repeating sequential alternating structure -A$_1$-B$_1$-A$_2$-B$_2$-A$_3$-B$_3$- having ion exchange groups in side chains characterized in that a terpolymer or a multi-component of four or more components, each of said copolymers comprising up to 60 mole % of one or more α,β,β-trifluoroacrylate having the generic formula CF$_2$=CFCOOC$_n$H$_{2n+1}$ wherein n represents an integer of 1–4; tetrafluoroethylene; and from 10–90 mole % of one or more α-olefin having the generic formula:

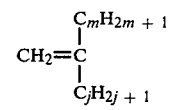

wherein j and m each independently represents an integer of 0 through 11 inclusive, and wherein A$_1$, A$_2$ and A$_3$ represent said α-olefin and B$_1$, B$_2$ and B$_3$ represent said tetrafluoroethylene and said α,β,β-trifluoroacrylate;

is subjected to hydrolyzing treatment to introduce carboxylic groups into the copolymer, and then the resulting copolymer is exposed to ionizing radiation in air or in an inert gas atmosphere.

34. The process as defined in claim 33 wherein said α,β,β-trifluoroacrylate is methyl α,β,β-trifluoroacrylate.

35. The process as defined in any of claims 33 or 34 wherein the terpolymer containing ethylene as the α-olefin component is used as a starting material.

36. The process as defined in any of claims 33 or 34 wherein the terpolymer containing propylene as the α-olefin component is used as a starting material.

37. The process as defined in claim 33 wherein said α,β,β-trifluoroacrylate is ethyl α,β,β-trifluoroacrylate.

38. The process as defined in claim 33 or 37 wherein said α-olefin is ethylene.

39. The process as defined in claim 33 or claim 37 wherein said α-olefin is propylene.

40. The process as defined in claim 33 wherein said α,β,β-trifluoroacrylate is butyl α,β,β-trifluoroacrylate.

41. The process as defined in claim 33 or claim 40 wherein said α-olefin is ethylene.

42. The process as defined in claim 33 or claim 40 wherein said α-olefin is propylene.

43. The process as defined in claim 33 wherein the terpolymer comprising tetrafluoroethylene, methyl α,β,β-trifluoroacrylate, and ethylene is used as a starting material.

44. The process as defined in claim 33 wherein the terpolymer comprising tetrafluoroethylene, methyl α,β,β-trifluoroacrylate and propylene is used as a starting material.

45. The process as defined in claim 33 wherein the four-component copolymer comprising tetrafluoroethylene, methyl α,β,β-trifluoroacrylate, ethylene and propylene is used as a starting material.

46. The process as defined in claim 33 wherein the five-component copolymer comprising tetrafluoroethylene, methyl α,β,β-trifluoroacrylate, ethylene, propylene and isobutylene is used as a starting material.

47. The process as defined in claim 33 wherein the four-component copolymer comprising tetrafluoroethylene, methyl α,β,β-trifluoroacrylate, ethyl α,β,β-trifluoroacrylate and ethylene is used as a starting material.

48. The process as defined in claim 33 wherein the terpolymer comprising tetrafluoroethylene, ethyl α,β,β-trifluoroacrylate and ethylene is used as a starting material.

49. The process as defined in claim 33 wherein the terpolymer comprising tetrafluoroethylene, ethyl $\alpha,\beta,\beta$-trifluoroacrylate and propylene is used as a starting material.

50. The process as defined in claim 33 wherein the four-component copolymer comprising tetrafluoroethylene, ethyl $\alpha,\beta,\beta$-trifluoroacrylate, ethylene and propylene is used as a starting material.

51. The process as defined in claim 33 wherein the five-component copolymer comprising tetrafluoroethylene, ethyl $\alpha,\beta,\beta$-trifluoroacrylate, ethylene propylene and isobutylene is used as a starting material.

52. The process as defined in claim 33 wherein the terpolymer comprising tetrafluoroethylene, butyl $\alpha,\beta,\beta$-trifluoroacrylate and ethylene is used as a starting material.

53. The process as defined in claim 33 wherein the terpolymer comprising tetrafluoroethylene, butyl $\alpha,\beta,\beta$-trifluoroacrylate and propylene is used as a starting material.

54. The process as defined in claim 33 wherein the four-component copolymer comprising tetrafluoroethylene, methyl $\alpha,\beta,\beta$-trifluoroacrylate, ethylene and propylene is used as a starting material.

55. The process as defined in claim 33 wherein the five-component copolymer comprising tetrafluoroethylene, methyl $\alpha,\beta,\beta$-trifluoroacrylate, ethylene, propylene and isobutylene is used as a starting material.

56. The process as defined in claim 33 wherein ionizing radiation is electron beams or gamma rays.

57. A fluorine-containing multi-component interpolymer of regular repeating sequential alternating structure of $-A_1-B_1-A_2-B_2-A_3-B_3-$ according to the process of claim 1 or claim 33.

* * * * *